Oct. 25, 1932.    A. P. McLEAN    1,884,057
CHAIN TIGHTENER
Filed May 23, 1930
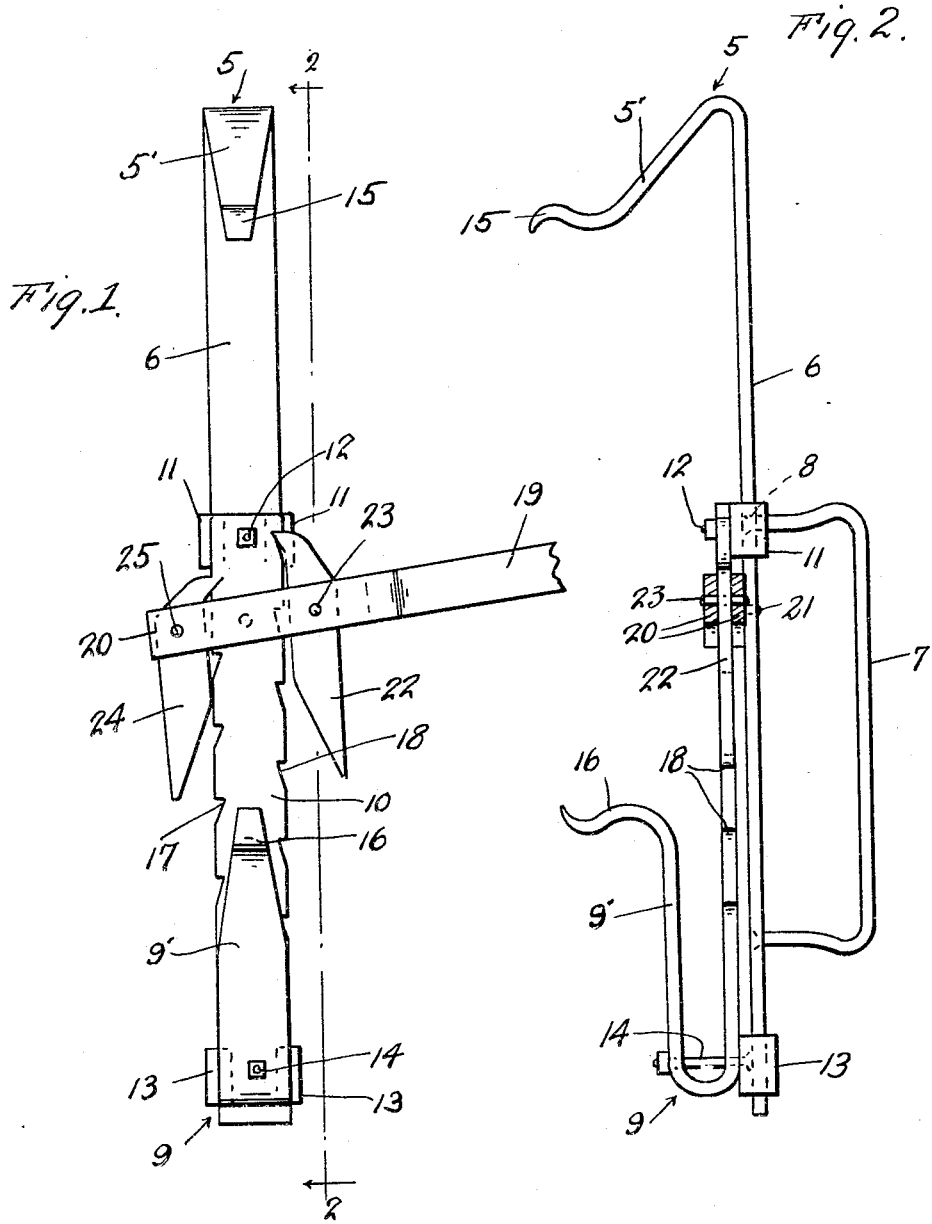
Inventor
Alfred P. McLean
By Clarence A. O'Brien
Attorney Patented Oct. 25, 1932

1,884,057

UNITED STATES PATENT OFFICE

ALFRED P. McLEAN, OF MYERS, KENTUCKY

CHAIN TIGHTENER

Application filed May 23, 1930. Serial No. 455,018.

This invention relates to a device for tightening chains, and has more particularly reference to a device especially adapted for tightening automobile and truck anti-skid chains.

Broadly, the invention consists in a pair of chain engaging hooks having overlapping slidably associated shanks, one of said hooks being movable relative to the other of said hooks for drawing portions of the chain together for tightening the chain together with suitable ratchet teeth for actuating the movable hooks.

A still further object of the invention is to provide a device of the above mentioned character which is composed of comparatively few parts, is easy to manipulate, strong, durable, practical, efficient and otherwise well adapted for the purpose designed.

Other objects and advantages of the invention will become apparent during a study of the following description, taken in connection with the accompanying drawing, wherein:

Figure 1 is a top plan view of the improved chain tightener,

Figure 2 is a longitudinal section on line 2—2 of Figure 1.

With reference more in detail to the drawing, it will be seen that 5 designates a relatively stationary hook having an elongated shank 6. A substantially U-shaped handle 7 has the end thereof suitably secured to the shank 6 intermediate the ends of the shank as at 8—8.

A movable hook is designated by the reference character 9, said relatively movable hook embodying a shank 10 arranged in overlapping sliding relation with respect to the shank 6, with the hook 9 at that end of the shank 6 remote from the bill of the hook 5. Suitably secured to the shank 10 at the free end thereof is a transversely disposed loop member 11 bolted or otherwise secured to the free end of the shank as at 12. A second loop member 13 is secured to the shank 10 adjacent the bight of the hook 9 through the means of a suitable bolt 14 passing through the shank 10 and bill 9 adjacent the bight of the hook. The shank 6 is slidable in the loops 13, 11, it being understood that said loop may be split to accommodate the legs of the handle 7 to permit of relative sliding movement of the hook without interference of the handle 7.

With reference more in detail to the structure of the hook 5, it will be noted that the same may be made from a single length of strap metal so as to provide the elongated shank 6 bent at one end to provide the bill 5' of the hook 5, the bill 5' and its free end merging into an angularly disposed curved terminal 15.

With reference more in detail to the hook 9 it will be seen that the said hook 9 is likewise formed from a single length of suitable strap metal one portion of which constitutes the shank 10 and the metal intermediate its ends being bent into a substantial U to provide the bill 9' extending in spaced parallelism to the shank 10, the bill 9' inclined at its free end merging into a lateral extending curved terminal 16 extending in the same direction as the terminal 15.

As before described in detail the shanks of the hooks are arranged in relative sliding relation, and the shank 10 of the hook 9 on opposite longitudinal edges thereof being provided with a series of longitudinally spaced ratchet teeth 17 and 18 respectively, the series of teeth 18 being arranged in alternate relation with respect to the series of teeth 17.

An actuating lever is designated generally by the reference character 19, and at one end thereof the lever is bifurcated or forked to provide a pair of spaced parallel coextensive leg members 20. The leg members 20 straddle the shank 10 adjacent the free end of the shank and the forked end of the lever is pivoted to the shank 6 intermediate their ends as at 21. A dog 22 is pivoted adjacent one end as at 23 between the legs 20, and said one end of the dog is adapted to engage with the teeth 18. A similarly shaped dog 24 is pivoted adjacent one end as at 25 between the free end of the legs 20 and said one end of the dog 24 is adapted to engage with the teeth 17.

In operation, the handle 7 is rigidly gripped in one hand by the operator and the hook 9 engages one link of the chain to be tightened while the hook 5 engages a second link of the chain to be tightened. By rocking the lever 19 in the direction of the arrow it will be apparent that the dogs 22, 24 are brought into engagement with their respective series of teeth 17 and 18, the teeth of the respective series being successively engaged by the dogs during rocking movement of the lever 19 whereby the hook 5 being held in the hand of the operator against movement, the hook 9 is moved longitudinally of the hook 5 in the direction indicated by the arrow, in Figure 1 or toward the bill of the hook 5 thus drawing the said links of the chain together resulting in a tightening of the chain as is apparent.

Even though I have herein shown and described the preferred embodiment of my invention it is to be understood that the same is susceptible to changes fully comprehended by the spirit of the invention as herein described, and the scope of the appended claims.

Having thus described my invention, what I claim as new is:

1. A device of the character described comprising a pair of cooperating hooks each of which includes an elongated flat shank, means on one of said shanks engaging the shank of the other of said hooks for retaining the shanks in parallel sliding engagement, the shank of one of said hooks being also provided on relatively opposite edges thereof with teeth, a lever pivotally connected to the shank of the other of said hooks, and dogs pivotally mounted on said lever and engaging said teeth for shifting the shank of said one hook longitudinally relative to the shank of said other hook.

2. A chain tightener comprising in combination a pair of hooks arranged in confronting relation and each including a relatively elongated flat shank, sleeves on the shank of one of said hooks slidably embracing the shank of the other of said hooks, a lever pivoted to the shank of said other hook, interengaging means on the lever and the shank of said one hook for shifting the latter longitudinally, and a handle fixedly secured to the shank of said other hook.

In testimony whereof I affix my signature.
ALFRED P. McLEAN.